United States Patent
Nishio et al.

(10) Patent No.: US 7,558,879 B2
(45) Date of Patent: Jul. 7, 2009

(54) RECEIVING APPARATUS, RECEIVING METHODS, AND NAME RESOLVING METHOD

(75) Inventors: Fumihiko Nishio, Tokyo (JP); Yoshihisa Gonno, Kanagawa (JP); Tomohiro Tsunoda, Tokyo (JP); Yasuaki Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 803 days.

(21) Appl. No.: 10/240,983
(22) PCT Filed: Feb. 1, 2002
(86) PCT No.: PCT/JP02/00820

§ 371 (c)(1),
(2), (4) Date: Mar. 27, 2003

(87) PCT Pub. No.: WO02/063474

PCT Pub. Date: Aug. 15, 2002

(65) Prior Publication Data

US 2003/0208625 A1    Nov. 6, 2003

(30) Foreign Application Priority Data

Feb. 5, 2001   (JP)   ............................... 2001-28387

(51) Int. Cl.
*G06F 15/16* (2006.01)
(52) U.S. Cl. ...................................... 709/245; 709/219
(58) Field of Classification Search ................. 709/245, 709/203, 247
See application file for complete search history.

(56) References Cited

U.S. PATENT DOCUMENTS 6,032,197 A * 2/2000 Birdwell et al. ............. 709/247

(Continued)

FOREIGN PATENT DOCUMENTS

EP         0 844 766        5/1998

(Continued)

OTHER PUBLICATIONS

Douglas E. Comer, TCP/IP ni yoru Network Kochiku-Genri—Protocol—Architecture, Kyoritsu Shuppan Co., Ltd., Jul. 5, 1990, pp. 171-184 (Douglas E. Comer, Internetworking With TCP/IP Principles, Protocols, and Architecture, Prentice-Hall, Inc., 1988, pp. 215-231).

*Primary Examiner*—Patrice Winder
*Assistant Examiner*—Minh-Chau Nguyen
(74) *Attorney, Agent, or Firm*—Frommer Lawrence & Haug LLP; William S. Frommer; Ellen Marcie Emas (57) ABSTRACT

At step S1, a URI of a desired content is input. At step S3, corresponding to the input URI, a proper resolution executing portion is selected. A plurality of resolution executing portions perform processes in parallel. At step S4, with reference to a correlation table that correlates identification names of contents and file names in a storing unit, a name resolving process is performed. At step S6, with reference to name resolution table data transmitted as an MPEG2 section table in a satellite broadcast, a name resolving process is performed. At step S8, by communicating with a name resolving service on a network such as DNS, a name resolving process is performed. After the name resolving processes in all methods have been completed, at step S10, an acquired location list L is sent to a content acquiring portion. The content acquiring portion references the list L and acquires a content designated by the URI.

12 Claims, 7 Drawing Sheets

U.S. PATENT DOCUMENTS

| | | | | |
|---|---|---|---|---|
| 6,041,359 | A * | 3/2000 | Birdwell | 709/238 |
| 6,154,738 | A * | 11/2000 | Call | 707/4 |
| 6,324,585 | B1 * | 11/2001 | Zhang et al. | 709/245 |
| 6,332,158 | B1 * | 12/2001 | Risley et al. | 709/219 |
| 6,535,507 | B1 * | 3/2003 | Li et al. | 370/356 |
| 6,628,625 | B1 * | 9/2003 | Birdwell et al. | 370/270 |
| 6,728,767 | B1 * | 4/2004 | Day et al. | 709/223 |
| 6,738,828 | B1 * | 5/2004 | Keats et al. | 709/245 |
| 7,072,955 | B1 * | 7/2006 | Huckins | 709/223 |
| 7,082,476 | B1 * | 7/2006 | Cohen et al. | 709/246 |
| 7,450,560 | B1 * | 11/2008 | Grabelsky et al. | 370/352 |

FOREIGN PATENT DOCUMENTS

| | | |
|---|---|---|
| EP | 0 848 553 | 6/1998 |
| JP | 2000-285057 | 10/2000 |

\* cited by examiner

| URI | Locator |
|---|---|
| uri://abc/ghi.mpg | file://abc-def-ghi.mpg |
| uri://abc/zzz.mpg | file://xxx-yyy-zzz.mpg |
| ... | ... |

| URI | Locator |
|---|---|
| uri://abc/ghi.mpg | dvb://123.256.789.111@2000-07-08T00:00:00D120 |
| uri://abc/ghi.mpg | dvb://123.256.789.111@2000-07-15T00:00:00D120 |
| uri://xxx/zzz.mpg | dvb://987.654.321.111@2000-07-10T12:00:00D120 |
| ... | ... |

| URI | Locator |
|---|---|
| uri://abc/ghi.mpg | http://192.168.0.1/def/ghi.mpg |
| uri://abc/ghi.mpg | http://172.16.0.1/def/ghi.mpg |
| uri://xxx/zzz.mpg | http://192.168.100.10/yyy/zzz.mpg |
| ... | ... |

RECEIVING APPARATUS, RECEIVING METHODS, AND NAME RESOLVING METHOD

TECHNICAL FIELD

The present invention relates to a receiving apparatus, a receiving method, and a name resolving method used in the technical field of for example data distribution.

BACKGROUND ART

Currently, on the Internet, information/data (content) described in HTML (Hypertext Markup Language)/XML (extensible Markup Language) is distributed. As a procedure for acquiring data on the Internet, the user inputs a URI (Uniform Resource Identification name) (or URL (Uniform Resource Locator), this notation is applied in the following description)) that identifies his or her desired content on a client unit. A content corresponding to the input URI is transmitted from a web server. The URI/URL is a standard notation used to reference data distributed on WWW (World Wide Web).

In a conventional data distributing system using the Internet, to convert an input URI into a content or to interpret an input URI as a content, a DNS (Domain Name System) and a web server perform a name resolving process for the content. The name resolving process normally stands for a process for translating a domain name into an IP address or vice versa. However, in this specification, the name resolving process stands for a process for converting an identifier into a physical location of a content or interpreting an identifier as a physical location of a content.

In future, it is expected that a data broadcasting system will be established and various types of contents such as program information and program advertisement information will be distributed through a broadcasting network. To reference and identify data that is distributed by such a data broadcasting system, it is preferred to reference them with the URI format that is used in HTML documents or the like of the Internet. However, it is difficult to interpret an URI and reference a corresponding content on a broadcasting network using the same name resolving system, which uses a DNS and a web server as a conventional web. Generally, a name resolving system dedicated for a URI of a content on a broadcasting network is used.

In future, when the Internet and the broadcasting network will be further unified, it can be predicted that a content uniquely identified by a particular URI is distributed on the Internet and a plurality of digital broadcasting networks. From this point of view, it is necessary to unify the URI name resolving system for the Internet and the URI name resolving system for digital broadcasting network.

Therefore, an object of the present invention is to provide a receiving apparatus, a receiving method, and a name resolving method that allow different content name resolving systems used on various networks to be unified.

DISCLOSURE OF THE INVENTION

To solve the forgoing problem, in one embodiment the present invention is a receiving apparatus for receiving data as a content to be provided, comprising:
a receiving means for receiving data;
a content storing means for storing data as a content received by the receiving means;
an identifier identifying means for identifying an identifier of a desired content;
a name resolving means for interpreting the identified identifier and identifying the location of the content;
a content acquiring means for acquiring a content from the location identified by the name resolving means;
a means for causing the content acquiring means to acquire a content; and
a reproducing means for reproducing a content acquired by the content acquiring means.

In another embodiment the present invention is a receiving method for receiving data as a content to be provided, comprising the steps of:
receiving data and storing the received content data;
identifying an identifier of a desired content;
interpreting the identified identifier and identifying the location of the content;
acquiring a content from the location identified at the name resolving step; and
reproducing the acquired content.

In an additional embodiment the present invention is a name resolving method, comprising the steps of:
identifying an identifier of a desired content;
interpreting the identified identifier; and
identifying the location of the content,
wherein the name resolving method includes a name resolution executing method, and
wherein the name resolution executing method is performed by referencing a correlation table that correlates identifiers and locations of contents.

According to the present invention, since there are an identifier identifying means and a name resolving means, content name resolving systems on a plurality of networks can be unified. In addition, according to the present invention, since name resolution table that is transmitted from the outside and an external name resolution table can be referenced, a new name resolving means can be easily extensibly used.

BEST MODES FOR CARRYING OUT THE INVENTION

Figure 1:
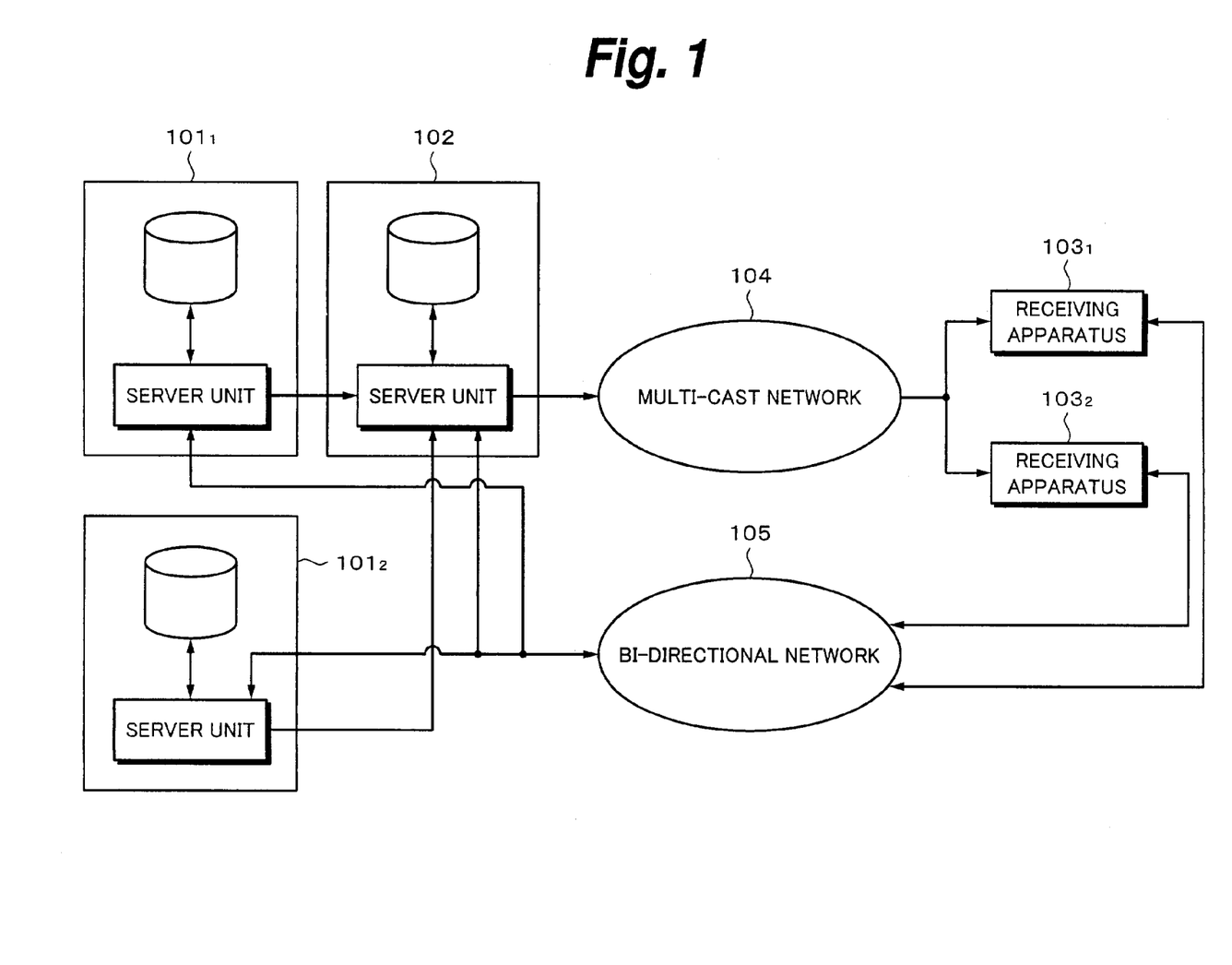
FIG. 1 is a block diagram showing the structure of a content providing system according to an embodiment of the present invention.

Next, with reference to the accompanying drawings, an embodiment of the present invention will be described. FIG. 1 shows an example of a content providing system according to the embodiment of the present invention. Information providing units 101$_1$ and 101$_2$ store content data that they provide in their server units. An example of content data is a WWW (World Wide Web) page described in XML or HTML. The information providing units $101_1$ and $101_2$ are connected to a broadcasting station 102 and receiving apparatuses $103_1$ and $103_2$ through a bi-directional network 105.

The broadcasting station 102 stores content data that it provides in its server unit. The broadcasting station 102 is connected to the receiving apparatuses $103_1$ and $103_2$ through a multi-cast network 104. As a result, the broadcasting station 102 provides content data to the receiving apparatuses $103_1$ and $103_2$. In addition, the broadcasting station 102 receives content data from the information providing units $101_1$ and $101_2$ through the bi-directional network 105 or a dedicated line and provides the received content data to the receiving apparatuses $103_1$ and $103_2$ through the multi-cast network 104. A real example of the multi-cast network is a broadcast (a digital broadcast such as a satellite broadcast or a ground wave broadcast).

The receiving apparatuses $103_1$ and $103_2$ receive and store contents and provide them to their users. Information of contents is transmitted to and stored in the receiving apparatuses $103_1$ and $103_2$ through the multi-cast network 104. Alternatively, information of contents is transmitted to the receiving apparatuses $103_1$ and $103_2$ through the bi-directional network 105.

Figure 2:
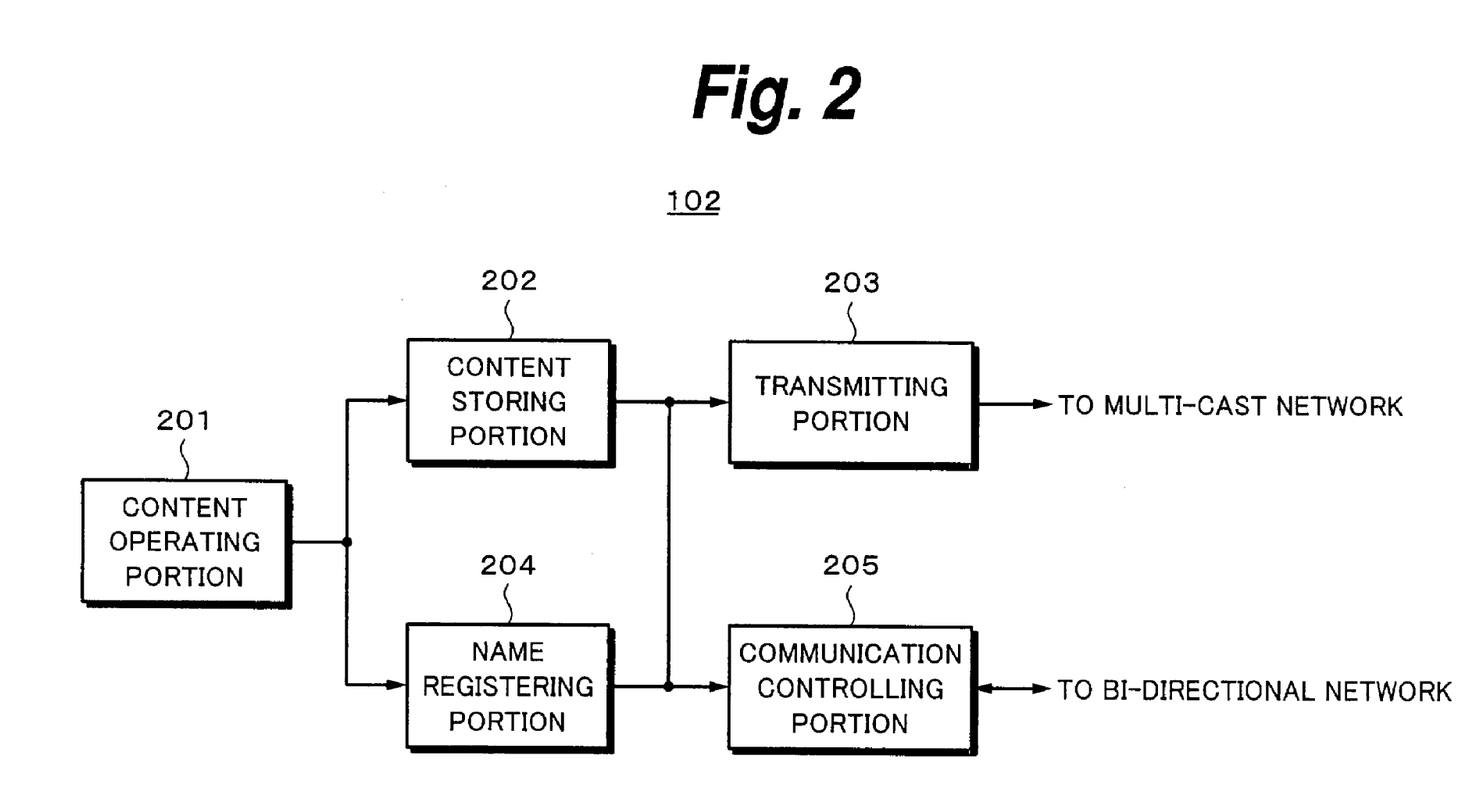
FIG. 2 is a block diagram showing the structure of an example of a broadcasting station according to an embodiment of the present invention.

FIG. 2 shows an example of the structure of the broadcasting station 102. A content operating portion 201 inputs a content. The input content is stored in a content storing portion 202. Each of contents stored in the content storing portion 202 is assigned a unique identification name. The identification names and information of locations of contents (this information is referred to as content location information) are stored in a name registering portion 204. The content location information is for example a file name of a content stored in the content storing portion 202 or a network address of a server that stores a content. When a content is broadcast, the content location information is for example information that designates a stream that is broadcast.

A content stored in the content storing portion 202 is transmitted to the receiving apparatuses $103_1$ and $103_2$ through a transmitting portion 203 and the multi-cast network 104. In addition, corresponding to requests from the receiving apparatuses $103_1$ and $103_2$, contents may be transmitted to the receiving apparatuses $103_1$ and $103_2$ through a communication controlling portion 205 and the bi-directional network 105.

As with a content, an identifier thereof and content location information stored in the name registering portion 204 are transmitted to the receiving apparatuses $103_1$ and $103_2$ through the transmitting portion 203 and the multi-cast network 104. In addition, when the receiving apparatuses $103_1$ and $103_2$ inquires for name resolving processes, corresponding to information of the name registering portion 204, the inquired content location information can be replied to the receiving apparatuses $103_1$ and $103_2$ through the communication controlling portion 205 and the bi-directional network 105.

The structure of each of the information providing units $101_1$ and $101_2$ is the same as the structure of the broadcasting station 102 except that each of the information providing units $101_1$ and $101_2$ does not contain the transmitting portion 203 shown in FIG. 2.

Figure 3:
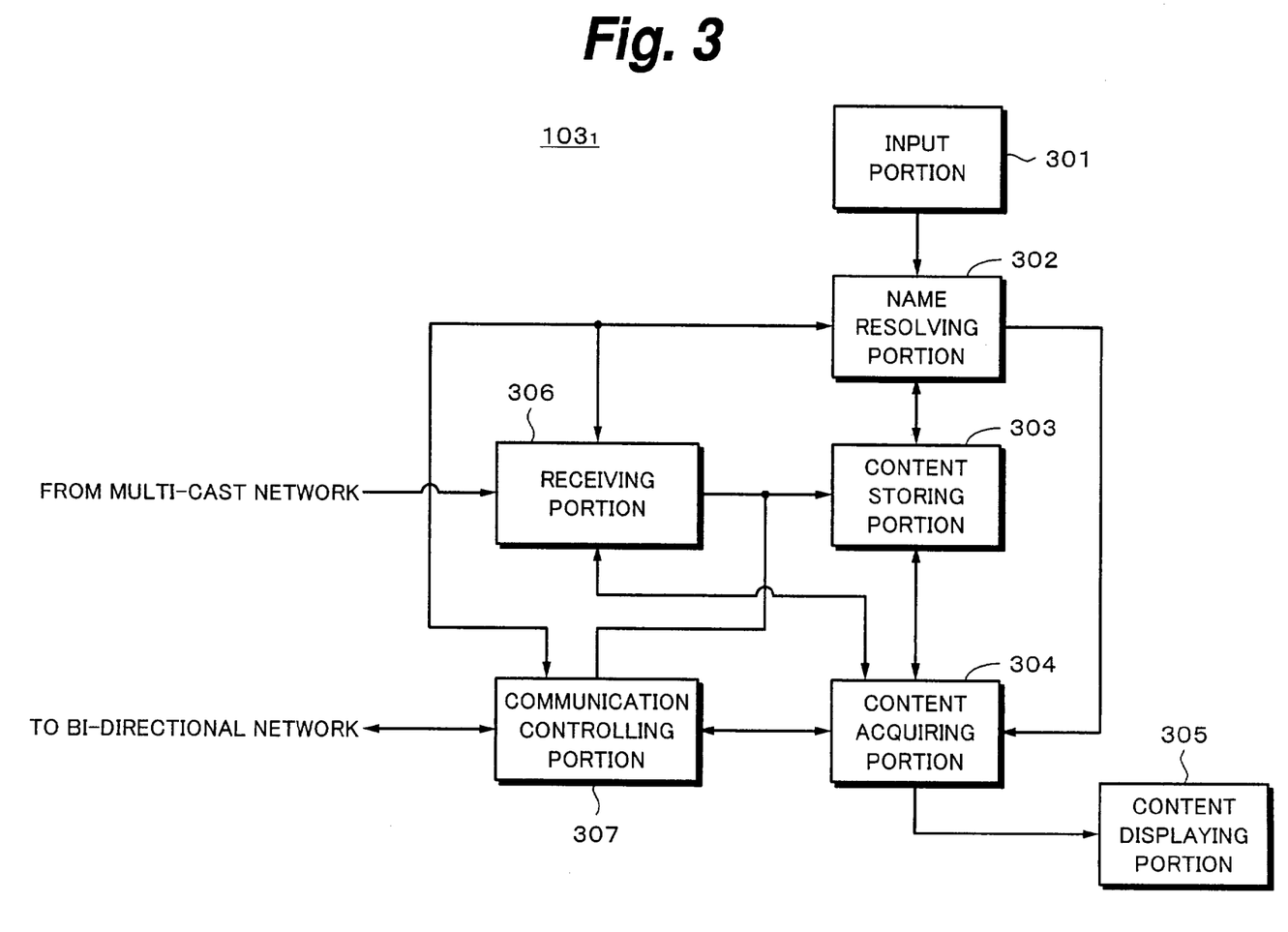
FIG. 3 is a block diagram showing the structure of an example of a receiving apparatus according to the embodiment of the present invention.

FIG. 3 shows an example of the structure of the receiving apparatus $103_1$. A receiving portion 306 receives a content through the multi-cast network 104 and stores the received content to a content storing portion 303. Alternatively, a communication controlling portion 307 receives a content through a bi-directional network on demand. The communication controlling portion 307 stores the received content to the content storing portion 303.

The user inputs an identification name of a desired content with an input portion 301. A name resolving portion 302 interprets an identifier of the input content and passes location information for the content to a content acquiring portion 304. The content acquiring portion 304 actually acquires a content corresponding to the received content location information passed from the name resolving portion 302.

To acquire a content through the multi-cast network 104, the receiving portion 306 is controlled by the content acquiring portion 304. Likewise, to acquire a content through the bi-directional network 105, the communication controlling portion 307 is controlled by the content acquiring portion 304. Normally, the acquired content is temporarily stored in the content storing portion 303. A content acquired through the content acquiring portion 304 is displayed on a content displaying portion 305.

Figure 4:
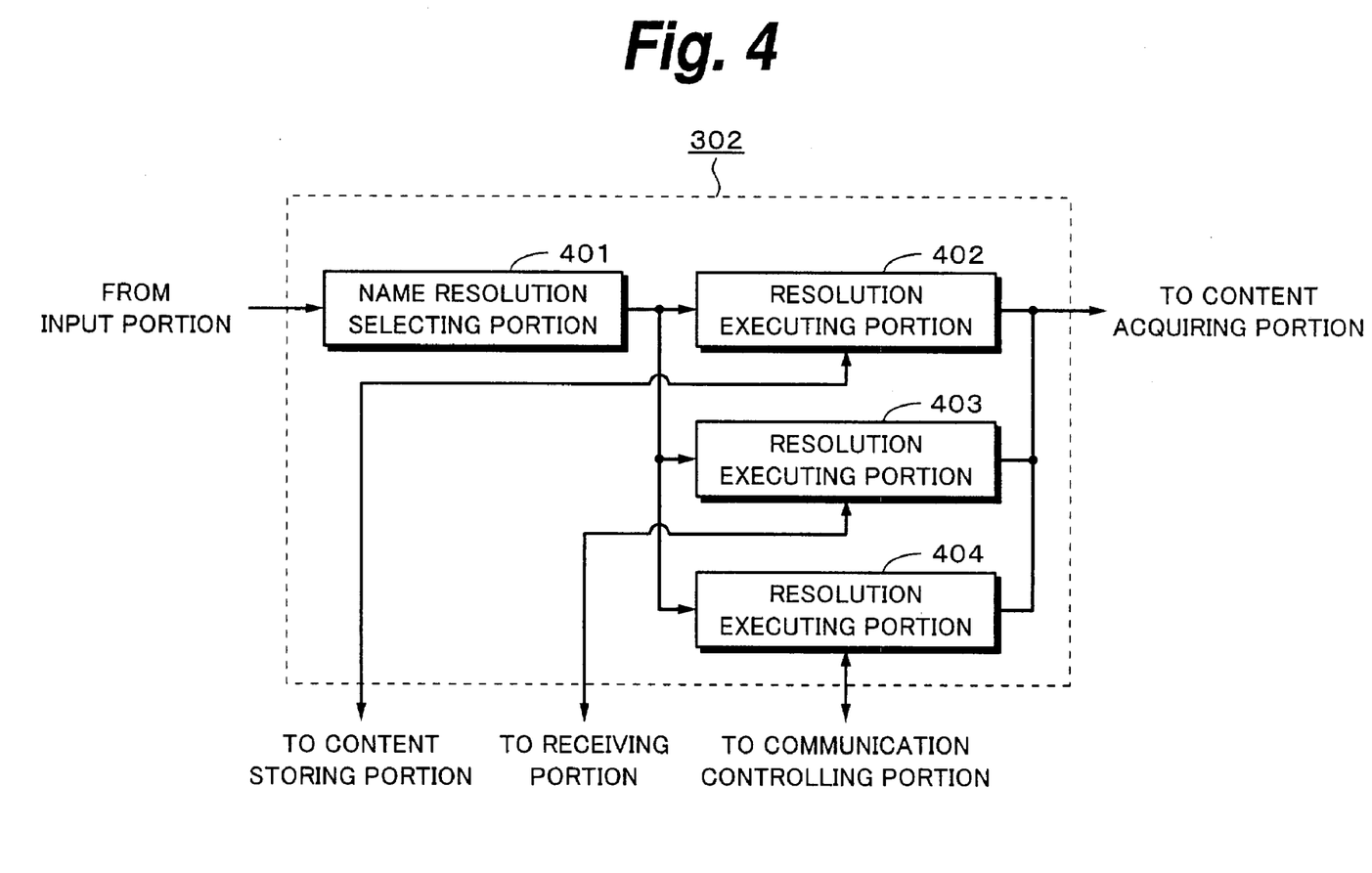
FIG. 4 is a schematic diagram showing the structure of an example of a name resolving portion of the receiving apparatus.

FIG. 4 shows a detailed structure of an example of the name resolving portion 302 of each of the information providing units $101_1$ and $101_2$. An identification name of a content that is input from the input portion 301 is converted into content location information by a name resolving process. There are various name resolution processing protocols for contents on the Internet, for contents on broadcasting networks, and for contents in storing/recording units of receiving apparatuses.

For a content on the Internet, a name resolving system, for example, a conventional DNS is used. For a content on a digital broadcast, a name resolving system that references a name resolution table that is broadcast along with the content is used. For a content in a storing/recording unit of a receiving apparatus, a name resolving system that references a correlation table that correlates identification names of contents and file names in the storing unit is used.

Besides a difference in name resolving protocols corresponding to network types, there is a possibility of which there is a difference in name resolving protocols corresponding to name managing organizations. For example, when a name resolving process for an identifier assigned by a system of a particular name managing organization is performed, it may be necessary to be connected to a special name resolving system.

The name resolving portion 302 causes a plurality of resolution executing portions 402, 403, and 404 to execute a plurality of different name resolving protocols. The resolution executing portion 402 references a correlation table that correlates identification names of contents and file names in the storing unit and performs a name resolving process. In contrast, the resolution executing portion 403 references a name resolution table broadcast along with a content in the receiving portion 306 and performs a name resolving process. The resolution executing portion 404 communicates with an external name resolving system through the communication controlling portion 307 and the bi-directional network 105 and performs a name resolving process. A name resolution selecting portion 401 selects a proper resolution executing portion corresponding to an identifier that is input from the input portion 301. The selected resolution executing portion performs a name resolving process.

Alternatively, when programs of the resolution executing portions 402, 403, and 403 are downloaded through a network, a new name resolving protocol can be used. The resolved content location information is sent to the content acquiring portion 304 (a plurality of types of content location information may be sometimes sent).

Figure 5:
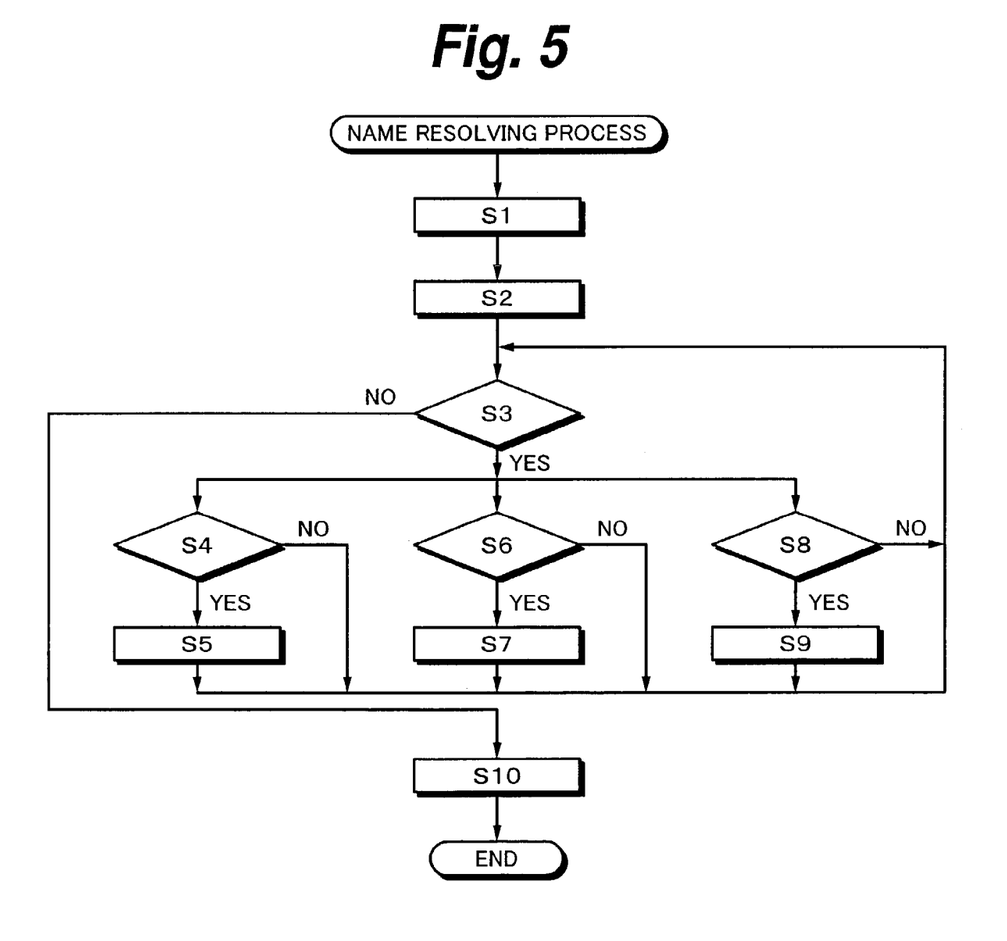
FIG. 5 is a flow chart showing a name resolving procedure.

FIG. 5 is a flow chart showing a name resolving process. At step S1, an identification name URI of a desired content is input with the input portion 301. At step S2, a content location list L is initialized. At step S3, with reference to the input URI, the name resolution selecting portion 401 selects a proper resolution executing portion from the resolution executing portions 402, 403, and 404. When a URI has a special format, a predetermined resolution executing portion performs a corresponding name resolving process. Since one content may be distributed on various networks, unless a resolution executing portion is selected corresponding to the format of the URI or the like, the resolution executing portions 402, 403, and 404 perform respective name resolving processes.

FIG. 5 shows processes that the resolution executing portions 402, 403, and 404 perform in parallel. In other words, the resolution executing portion 402 performs processes of steps S4 and S5. The resolution executing portion 403 performs processes of steps S6 and S7. The resolution executing portion 404 performs processes of steps S8 and S9. Alternatively, these resolution executing portions may successively perform their processes.

At step S4, the resolution executing portion 402 references a correlation table that correlates identifier names of contents and file names in a storing unit (for example, the content storing portion 303) and performs a name resolving process. At step S5, the resolution executing portion 402 adds location information corresponding to the input URI to the list L in the content storing portion 303. At step S6, the resolution executing portion 403 references name resolution table data transmitted as an MPEG2 section table in a satellite broadcast and performs a name resolving process. At step S7, the resolution executing portion 403 adds location information corresponding to the input URI to the list L. At step S8, the resolution executing portion 404 communicates with a name resolving service such as DNS on a network and performs a name resolving process. At step S5, the resolution executing portion 404 adds location information corresponding to the input URI to the list L. After the name resolving processes in all the methods have been completed, at step S10, the obtained location list L is sent to the content acquiring portion 304. The content acquiring portion 304 references the location list L and acquires a content designated by the URI.

Figures 6A, 6B, 6C:
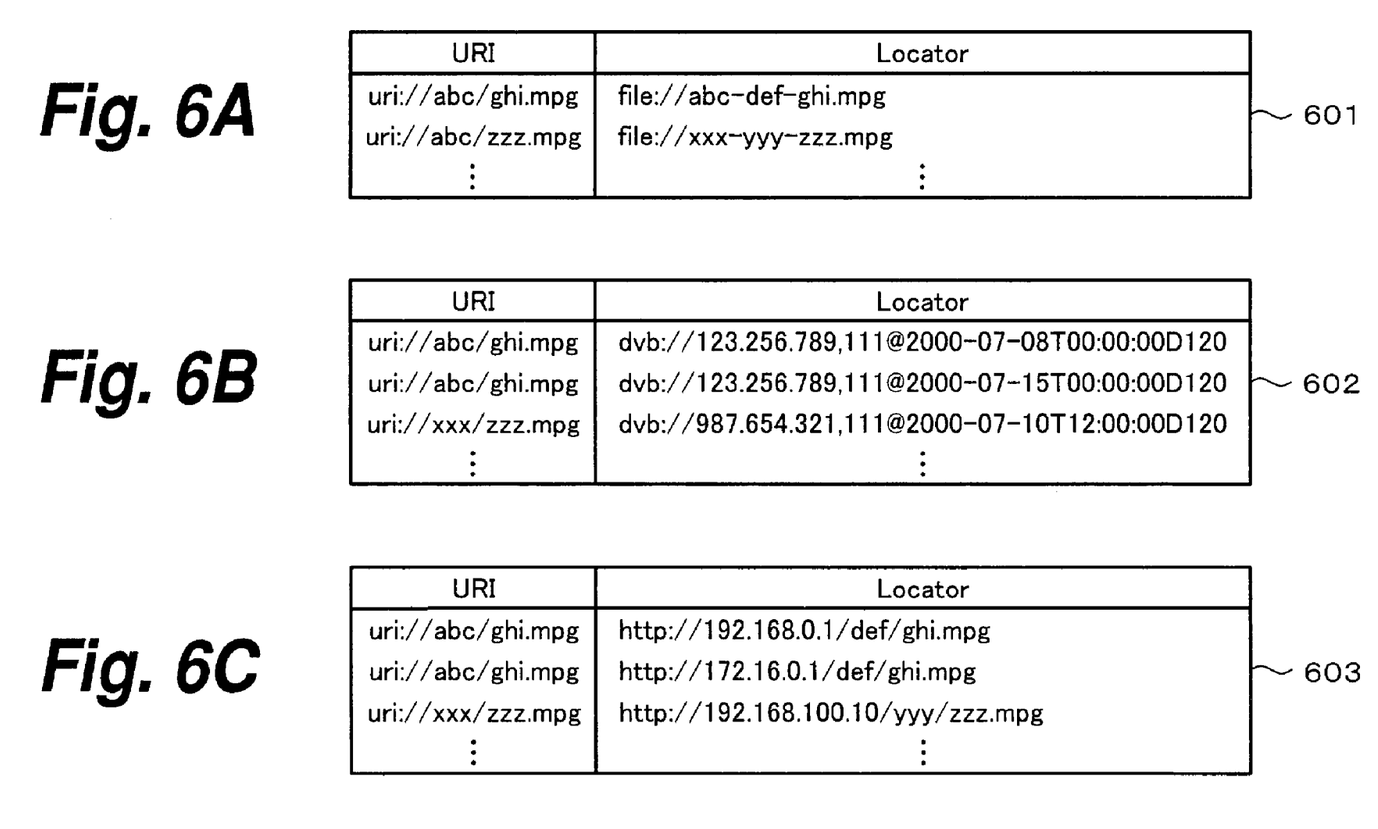
FIG. 6 is a schematic diagram showing an example of a correlation table of URIs and content locations.

FIG. 6 shows some examples of tables that correlate URIs and location information (locators). In FIG. 6A, reference numeral 601 represents a correlation table that correlates identification names and names of contents (file names) in the case that the contents have been stored in a storing unit of the receiving apparatus (for example, the content storing portion 303). The receiving apparatus manages the correlation table 601. The name resolution executing portion 402 references the correlation table 601, extracts a locator (file name) corresponding to the URI to be resolved, and supplies the extracted file name to the content acquiring portion 304.

In FIG. 6B, reference numeral 602 represents a correlation table that correlates identification names and location information (channels) that designates broadcast streams. The information providing units $101_1$ and $101_2$ on the transmission side or the broadcasting station 102 transmits the correlation table 602 in the format of for example MPEG2 section table. The receiving apparatus has received the correlation table 602. The name resolution executing portion 403 references the correlation table 602, extracts a locator corresponding to the URI to be resolved, and supplies the extracted locator to the content acquiring portion 304. The content acquiring portion 304 accesses a stream corresponding to the locator and acquires the content.

In FIG. 6C, reference numeral 603 represents a correlation table that correlates identification names and locations of content servers (addresses of servers and so forth) on the Internet in the case that the contents are stored in the servers on the Internet. A name resolving server on a network has such a correlation table 603. When the resolution executing portion 404 performs a name resolving process, the resolution executing portion 404 inquires the name resolving server for a locator corresponding to a URI and extracts the locator therefrom.

Figure 7:
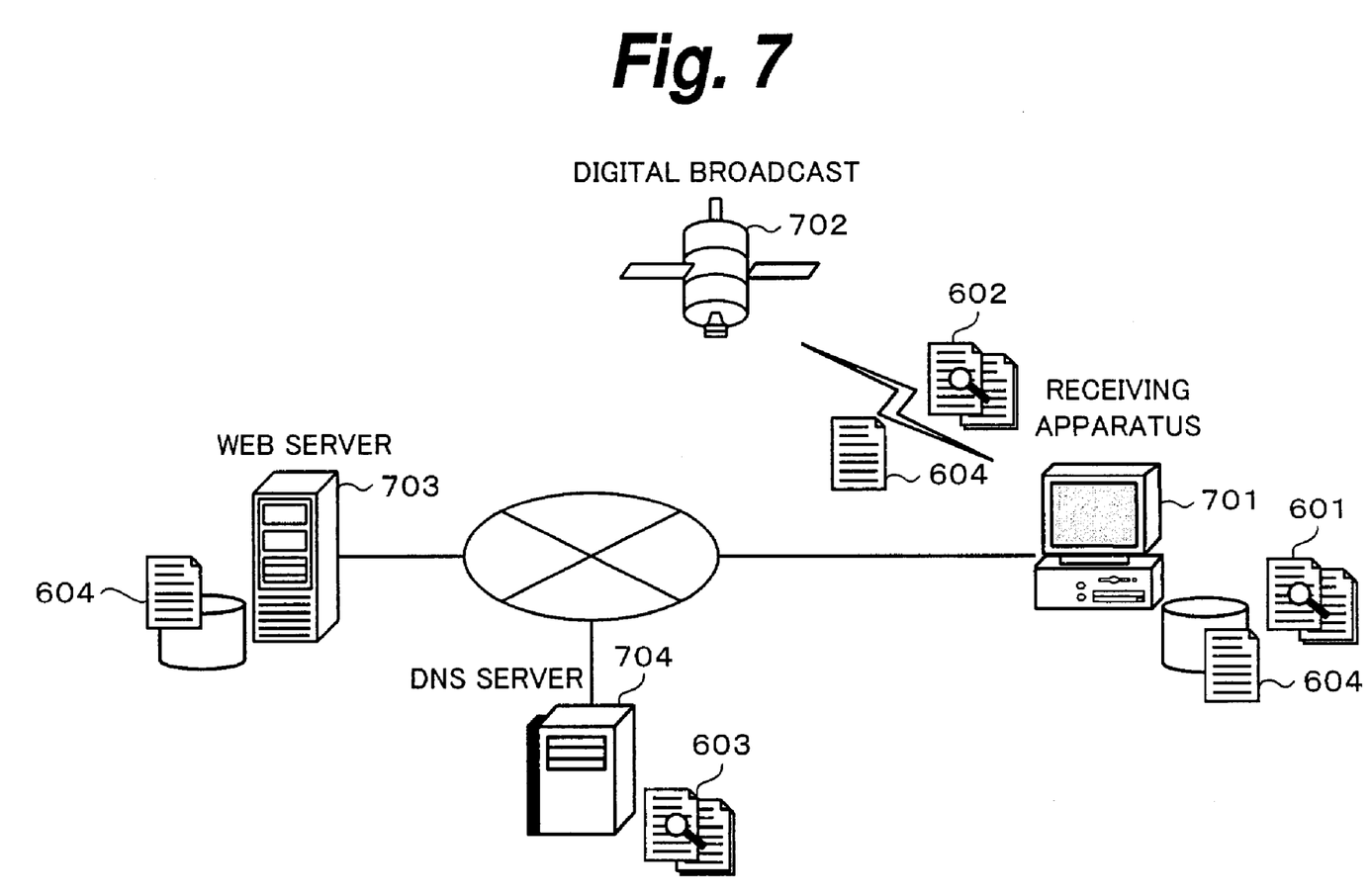
FIG. 7 is a schematic diagram for explaining a name resolving process of the content providing system.

FIG. 7 schematically shows a name resolving system. As an example, a content 604 with an identifier name (uri://abc/ghi.mpg) is present in the content storing portion 303 of a receiving apparatus 701, a data broadcast 702, and a web server 703 on the Internet. Location information that represents the location of the content 604 is described in the correlation tables 601, 602, and 603. The resolution executing portions 402, 403, and 404 perform the following name resolving processes for designating the location of the content 604.

The resolution executing portion 402 references the correlation table 601, which correlates identification names of contents and file names in the storing unit, and determines whether or not the content storing portion 303 has stored the content corresponding to the input URI. In the example of the correlation table 601 shown in FIG. 6A, the input URI has been stored. The locator is (file://abcdefghi.mpg).

As with a content, the resolution executing portion 403 references the correlation table 602 such as an MPEG-2 section table that is transmitted from a broadcasting station and performs a name resolving process. In the example shown in FIG. 6B, the locator corresponding to the input URI is (dvb://123.256.789; 111@2000-07-08T00:00:00D120).

The resolution executing portion 404 communicates with a name resolving service (a server that has the correlation table 603, which correlates names and locations, for example, a DNS server 704) on a network through the communication controlling portion 307 on demand and performs a name resolving process. In the example shown in FIG. 6C, the locator corresponding to the input URI is (http://192.168.0.1/def/ghi.mpg). The resolution executing portion 404 accesses a web server 703 represented by the locator and acquires the content.

It should be noted that the present invention is not limited to the forgoing embodiment. In other words, without departing from the sprit of the present invention, various modification and ramifications of the forgoing embodiment are available. For example, a name resolution executing means can be received through a network. An extensible system such as additional software for example plug-in software can be used. The content storing unit of the receiving apparatus is not limited to an internal hardware unit of the receiving apparatus. Alternatively, a storing unit that is accessible through an intra network can be used. In addition, as a network that has contents, other than the forgoing structure can be used. In addition, the present invention is not limited to content identifiers described in URI/URL. Other than identifiers described in URI/URL can be used.

According to the present invention, the content name resolving means of the receiving apparatus unifies content name resolving processes on various networks. Thus, by inputting an identifier of a content that has been unified regardless of the location thereof, the user can acquire the content. As a result, the operability of the receiving apparatus can be improved. In addition, according to the present invention, since a name resolution table that is transmitted from a broadcasting station and an external name resolution table can be referenced, a new name resolving means can be easily extensibly used.

The invention claimed is:

1. A receiving apparatus for receiving data from a plurality of different communication networks as a content to be provided, comprising:
   multi-cast receiving means for receiving data from a multi-cast network;
   bi-directional receiving means for receiving data from a bi-directional network;
   content storing means for storing data as a content received by the receiving means;
   identifier identifying means for identifying an identifier of a desired content;
   name resolving means for interpreting the identified identifier and identifying a physical location of the content, said physical location being the multi-cast network, the bi-directional network and the content stonng means;
   content acquiring means for acquiring a content from the physical location identified by the name resolving means;
   means for causing the content acquiring means to acquire a content; and
   reproducing means for reproducing a content acquired by the content acquiring means,
   wherein said name resolving means executing a plurality of different name resolving protocols by
      a first resolving means, which communicates with an external name resolving system for content located on the Internet through said bi-directional network and performs name resolution,
      a second resolving means, which references a name resolution table for digital stream broadcast network transmitted through said multi-cast network and performs name resolution, and
      a third resolving means, which correlates the identifiers of the contents with the contents stored in the content storing means.

2. The receiving apparatus as set forth in claim 1, wherein the name resolving means are disposed corresponding to name systems established by name managing organizations.

3. The receiving apparatus as set forth in claim 1, wherein the name resolving means is extensibly received through a network.

4. The receiving apparatus according to claim 1, wherein the received data includes information about the content received by the receiving means.

5. The receiving apparatus according to claim 1, wherein the received data includes content location information.

6. The receiving apparatus according to claim 1, wherein the external name resolving system is a domain name system.

7. The receiving apparatus according to claim 1, wherein the name resolution table is broadcast along with the contents.

8. The receiving apparatus according to claim 1, wherein the third resolving means references a correlation table that correlates the identifiers of the contents with file names in the content storing means.

9. A receiving method for receiving data from a plurality of different communication networks as a content to be provided, comprising the steps of:
   receiving content data from a multi-cast network;
   receiving content data from a bi-directional network;
   storing the received content data from the multi-cast network and the bi- directional network;
   identifying an identifier of a desired content;
   resolving a name location of the received content data by interpreting the identified identifier and identifying a physical location of the content, said physical location being the multi-cast network, the bi- directional network and a content storage of a receiving apparatus;
   acquiring a content from the physical location identified at the resolving step; and
   reproducing the acquired content,
   wherein resolving a physical location by executing a plurality of different name resolving protocols including the steps of
      communicating with an external name resolving system for content located on the Internet through said bi-directional network,
      referring to a name resolution table for a digital stream broadcast network, transmitted through said multi-cast network, and
      correlating the identifiers of the contents with the contents stored in the content storage.

10. The receiving method as set forth in claim 9, wherein the name resolving step is performed for each of name systems established by name managing organizations.

11. The receiving method as set forth in claim 9, wherein the resolving step is extensible by additional software.

12. The receiving apparatus according to claim 5, wherein the content location information insludes a file name of the contents, a network address of the contents, and information that designates a stream that is broadcast.

* * * * *